INVENTORS.
LESLIE B. HAIGH
HENRY F. HERBIG
BY ROBERT W. BLANCHARD
Charles Baraff
AGENT 3,051,790

ANSWERING SIGNAL DETECTOR FOR A PRIVATE AUTOMATIC BRANCH EXCHANGE

Leslie B. Haigh, West Orange, Henry F. Herbig, Smoke Rise, and Robert W. Blanchard, East Orange, N.J., assignors to International Telephone and Telegraph Corporation, Nutley, N.J., a corporation of Maryland Filed Dec. 31, 1958, Ser. No. 784,376
9 Claims. (Cl. 179—9)

This invention relates to answering signal detectors for automatic ticketing telephone systems and in particular to an answering signal detector for a private automatic branch exchange operating in conjunction with a major telephone system.

An object of the present invention is to provide protection against false operation in an answering signal detector for PABX by discriminating between the high frequency tones present in voice intelligence, and extraneous low frequency tones, such as pulsing transients or switching transients occuring during dialing, switching, ringing, etc., whereby a message register may be operated effectively only by the voice intelligence derived from the called party answering.

Another object of the invention is to provide an answering signal detector for a private automatic branch exchange which will block the calling party's voice signals from the detector until the called party answers.

A feature of the present invention is an answering signal detector having high and low pass filters for protective discrimination between voice intelligence and tones of low frequency such as dial tone, busy tone, transients and other supervisory signals of lower frequency than the voice components.

Another feature of the invention is a transistor amplifier which acts as a valve to block the path between the calling and called subscriber until the called party answers.

The above-mentioned and other features and objects of the invention will become more apparent by reference to the following description of an embodiment of the invention taken in conjunction with the accompanying drawings, in which.

Figure 1:
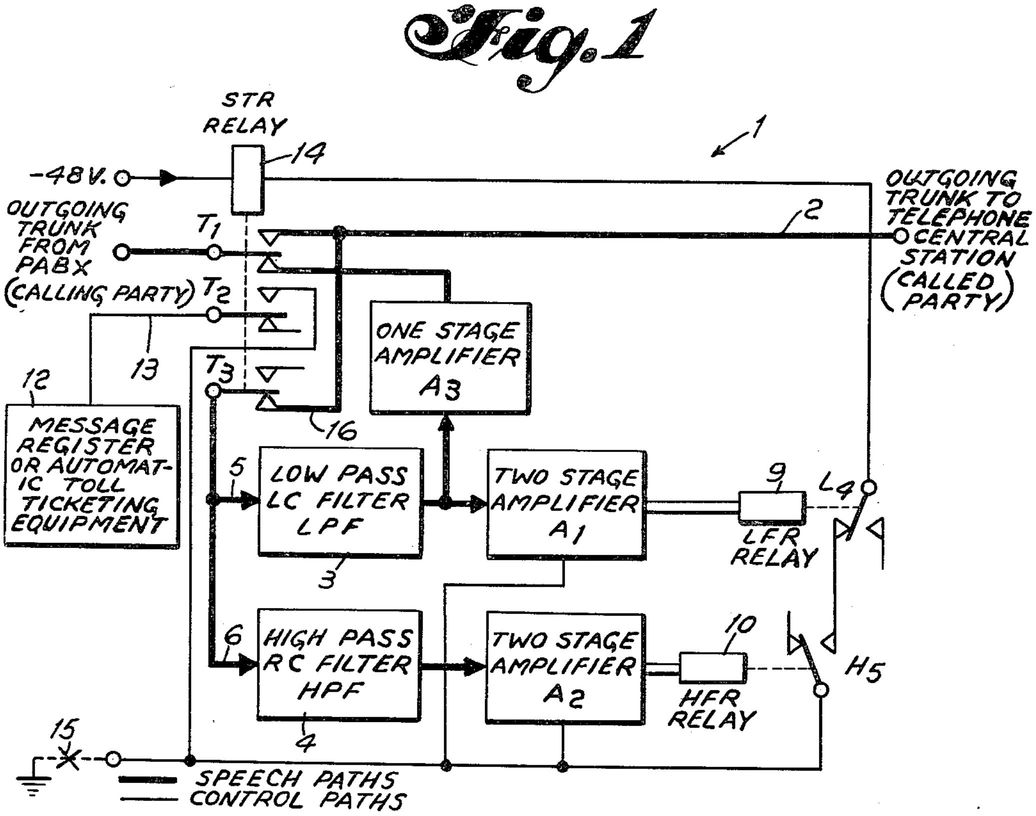
FIG. 1 is a block diagram of the answering signal detector.

Since the introduction of automatic toll ticketing it has been desired to record automatically the answering time and duration of a telephone call placed through a private automatic branch exchange (PABX).

Generally, answering supervision is originated in the prior art by the removal of a telephone handset or receiver by the called party, causing a reversed battery signal (electromagnetic control) to be received at the telephone control office. This signal can be used to control accounting equipment where the answering time and duration of a call are recorded. In the majority of situations, the answering supervisory signal terminates at the telephone central office serving the calling party associated with the PABX and is not transmitted on to the private automatic branch exchange.

The present invention is an improvement over answering detectors which utilize voice intelligence signals from the answering called party to control a message register as disclosed in the U.S. Patent application of L. B. Haigh-H. F. Herbig-A. C. Bucarey, Serial No. 705,952, filed December 30, 1957, and assigned to the same assignee as the present application, and systems that start metering a call after an elapsed time whether or not the call has been answered.

In accordance with the present invention, more efficient protection against false operation of the recording equipment was desired and provided in a detector of the type disclosed in the aforementioned application by L. B. Haigh-H. F. Herbig-A. C. Bucarey, Serial No. 705,952. In the present application, the protective circuit is provided by high pass and low pass filters in separate relay paths, the filters discriminating between voice intelligence and spurious pulsing transients and low frequency tones such as accompany dialing, ringing, busy signals, etc. These filters in association with transistor amplifiers and relay combinations operate to establish a talking path between subscribers only when the tone frequencies of the called party's voice are present on the line. As is apparent from the above-mentioned L. B. Haigh-H. F. Herbig-A. C. Bucarey application, the function of an answering signal detector is to monitor the call as it passes through the private automatic branch exchange and to determine at what moment the called party has answered and thence to signal the message register or recording system of the PABX to start timing the call.

In accordance with the present invention, the answering signal detector responds to the high frequency tones of the called party's voice to control the operation of a message register or toll call ticketing equipment. By means of a unidirectional transistor valve, the detector will not respond to the voice of the calling PABX telephone subscriber. In one practical embodiment, efficient protection against false operation by low frequency dial, busy tones and the like below 600 cycles per second, was effected through frequency discrimination by high and low pass filters located in paralell unidirectional paths, each path controlling a relay so that a talking path was established only in response to the voice intelligence tones of the called party.

Referring to FIG. 1, the answering signal detector circuit 1 is connected in series with the out-going trunk 2 to the telephone central station and called party. The answering signal detector 1 consists of low and high pass filters 3 and 4, connected in parallel and having unidirectional paths 5—5, 6—6, for controlling individually the low frequency relay 9 (LFR) and the high frequency relay 10 (HFR). A speech path which is normally broken at contact $T_1$ of signal transfer relay 14 (STR) is designed for the passage of speech in both directions from the calling party to the called party.

Unidirectional path 5—5 contains the low pass filter (LPF) 3 consisting of an LC network which will pass only the low frequencies below 600 cycles per second. Unidirectional path 6—6 will pass only the high frequencies through the high pass filter 4 consisting of an RC network and block the frequencies below 600 cycles. Each path controls a relay, respectively, relay (LFR) 9 being associated with low pass filter 3 and relay (HFR) 10 being associated with high pass filter 4.

In the unidirectional path 6—6, the high pass filter 4 passes the high frequency tones of the voice intelligence from the called part when he answers, and possibly some supervisory and transient signals through the two-stage transistor amplifier $A_2$ to operate relay 10 (HFR). A similar transistor amplifier $A_1$ is connected between the low pass filter 3 and relay 9 to operate the latter.

Due to transistor valve action, the transistor amplifier $A_3$ provides a unidirectional path from the called party to the calling party, allowing the calling party to hear the ring back dial and busy tones while blocking his voice from operating the circuits of the answering signal detector 1. This circuit path may be traced from the circuit of the called party along the speech path 2, lead 16, closed contact $T_3$ of relay 14, through LPF filter 3, through transistor amplifier $A_3$, closed contact $T_1$ of relay 14, to the circuit of the calling party.

The proper combination of frequency inputs to the high and low pass filters 3 and 4 denoting the called party answering will only operate the proper path relay 10 and close the path for operating the STR relay. The operation of relay STR disconnects the speech path 2 from the detector and connects it metallically through to the circuit of the calling party thereby allowing the speech conversation to begin. The circuit path for operating relay 14 comprises ground 15, contact $H_5$ of relay 10 released closed contact $L_4$ of relay 9, relay 14 to battery. Also at this time, a circuit to the message register 12 or timing equipment of an automatic message recorder is connected at contact $T_2$ when relay 14 operates, initiating the timing of the call.

Busy tone, dial tone and ring back tone predominate in the low frequency range, generally below 600 cycles per second, while the voice frequency of the answering party dominates in the high frequency range above 600 cycles per second so that high pass filter 4 responds primarily to voice intelligence derived from the called party.

Figure 2:
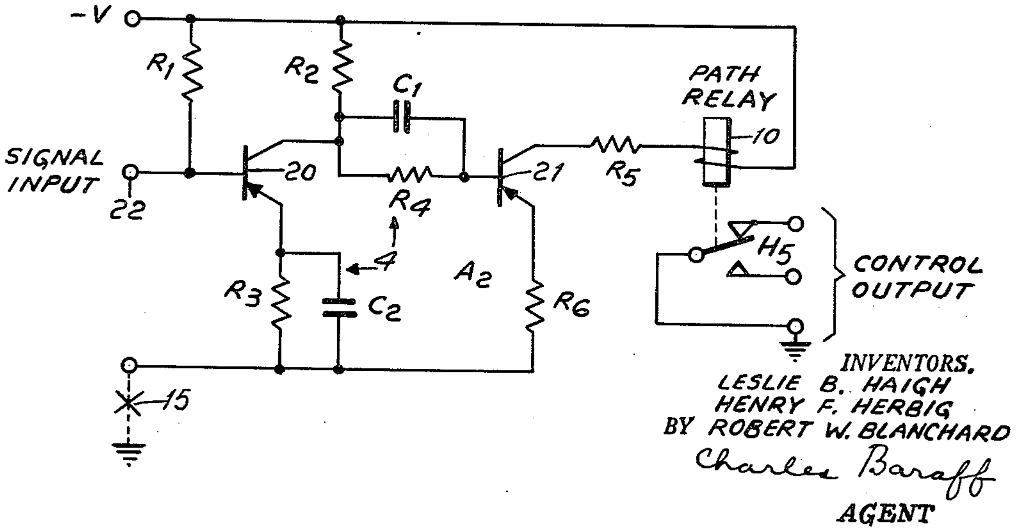
FIG. 2 is a two-stage transistor amplifier for controlling a path relay in the low and high frequency paths of the detector.

The two stage transistor amplifiers $A_1$ and $A_2$ are shown in FIG. 2. Transistors 20 and 21 are PNP type and transistor 21 of the last stage is biased so that it normally conducts with no signal input at terminal 22. The path relays 9 and 10 are located respectively in the collector circuit of each transistor amplifier 20 and 21.

In the operation of the answering signal detector 1, when power is applied thereto, the path relays 9 and 10 become energized from the —48 volt battery source and the sets of contacts $L_4$ $H_5$, respectively, will be in the position shown in FIG. 1. With the detector circuit 1 in this condition, dial pulses but no voice signals may pass from the calling party to the telephone central exchange due to the blocking action of the amplifier $A_3$.

Supervisory signals coming from the telephone exchange circuits are passed along trunk 2 to the low frequency path 5—5 while being blocked by the high pass filter 4. The voice frequencies predominantly flow through the high frequency path 6—6 because of the blocking effect of the low pass filter 3.

During and after dialing, supervisory signals and switching transients appear but no voice frequencies are present. This causes only relay 9 (LFR) in path 5—5 to de-energize, thereby opening the circuit of the relay 14 (STR) at contact $L_4$ and preventing the closure of the circuit to the call recording equipment 12. In some areas, the transients and high frequency components of dial and busy tones may de-energize relay 10 also, but operation of the STR relay 14 is prevented as long as relay 9 (LFR) is also de-energized.

Under normal operating conditions, all supervisory signals except ring back tone and all switching transients have ceased by the time the called party removes the handset from the cradle to answer the call. This allows LFR relay 9 in the detector 1 to remain energized and maintain contact $L_4$ thereof connected to relay 14.

At this stage, the called party answers and the voice intelligence tones of the called party answering causes relay 10 (HFR) to de-energize and close contact $H_5$ thereof to operate relay 14, thereby connecting at contact $T_1$, the calling and called sections of the trunk 2 together for two-way conversation. Holding contacts (not shown) then maintain relay 14 (STR) for the duration of the conversation.

The energizing of relay 14 causes contact $T_2$ thereof to close, thereby activating the message register 12 connected to terminal 13. Thus, a register or timer would be operated as the call is answered and held until the call is disconnected. When the call is disconnected, the ground connection 15 is removed, disconnecting power from the detector circuit 1 and de-energizing relay 14 which breaks the two-way speech path at the contact $T_1$ connection thereof.

In order to prevent a free prearranged one-way conversation by having the called party give the required information in low tones that would not de-energize relay 10, the voice signal is greately attenuated by the low pass filter 3, and then slightly amplified by transistor amplifier $A_3$ and sent to the calling party. Any voice tone loud enough and of proper pitch to convey information would be sufficient to release the HFR relay 10.

It is sometimes possible for the called party to speak loudly with a bass voice and de-energize both relays 9 and 10 momentarily but attempts to defeat detection by this means will prove unsuccessful because the voice intelligence varies in pitch with each syllable and within a few syllables the detector circuit makes proper detection. Also, the high impedance of the detector greatly attenuates voice signals until relay STR operates and connects the circuit of the calling and called parties metallically together.

While we have described above the principles of our invention in connection with specific apparatus, it is to be clearly understood that this description is made only by way of example and not as a limitation to the scope of our invention as set forth in the objects thereof and in the accompanying claims.

We claim:

1. An answering signal detector for a private automatic branch exchange comprising a calling and a called end, a voice operated device, means connected to the called end for discriminating between voice intelligence signals originating at the called end of relatively high frequency and supervisory tones of low frequency and means activated by said voice intelligence for operating said device.

2. The answering signal detector of claim 1, wherein the means for discriminating comprises two unidirectional paths, one path including a high pass filter and the other path including a low pass filter.

3. An answering signal detector for a private automatic branch exchange comprising a calling and a called end, a voice operated device, means connected to the called end for discriminating between voice intelligence signals originating at the called end of relatively high frequency and supervisory tones of low frequency and means activated by said voice intelligence for operating said device, the means for discriminating comprising two unidirectional paths, one path including a high pass filter and the other path including a low pass filter, a third speech path connected between the calling end and the called end, and a unilateral amplifying device in said third path adapted to block the calling party's voice signals from the answering detector.

4. The answering signal detector of claim 2 and a path relay connected to each filter, one of said relays being responsive to the high frequency components of voice signals to control a speech path between the calling end and the called end.

5. The answering signal detector of claim 4 and a control relay associated with a speech path between said called and said device being calling end and a message register operated by one of said path relays.

6. The answering signal detector of claim 4 and a transistor amplifier connected between each filter and path relay, each amplifier being biased to normal conduction with no signal input thereto.

7. The signalling detector of claim 6 wherein the low frequency path relay is de-energized by low frequency supervisory tone, and means for preventing the operation of said speech path control relay when the low frequency relay is de-energized.

8. The signalling detector of claim 6 and means connected to the high pass filter to cause the associated path relay to de-energize when the called party answers and thereby operate said speech path control relay.

9. A transmission bridge for a telephone system having a calling end and a called end, a voice operated device, means for excluding calling end speech signals from said device and from said called end, means for transmitting low frequency supervisory tones from said called to said calling end and means for transmitting the high frequency component of speech from the called end to operate said device and means responsive to the detection of said high frequency component to by-pass said bridge.

References Cited in the file of this patent

UNITED STATES PATENTS

| | | |
|---|---|---|
| 1,734,104 | Wright | Nov. 5, 1929 |
| 2,132,180 | Mitchell | Oct. 4, 1938 |
| 2,814,674 | Stallworthy et al. | Nov. 26, 1957 |
| 2,883,473 | McDermott | Apr. 21, 1959 |
| 2,883,474 | Fritschi | Apr. 21, 1959 |